April 28, 1925.
C. LE G. FORTESCUE
1,535,594
ELECTRICAL MEASURING INSTRUMENT
Original Filed Aug. 9, 1920
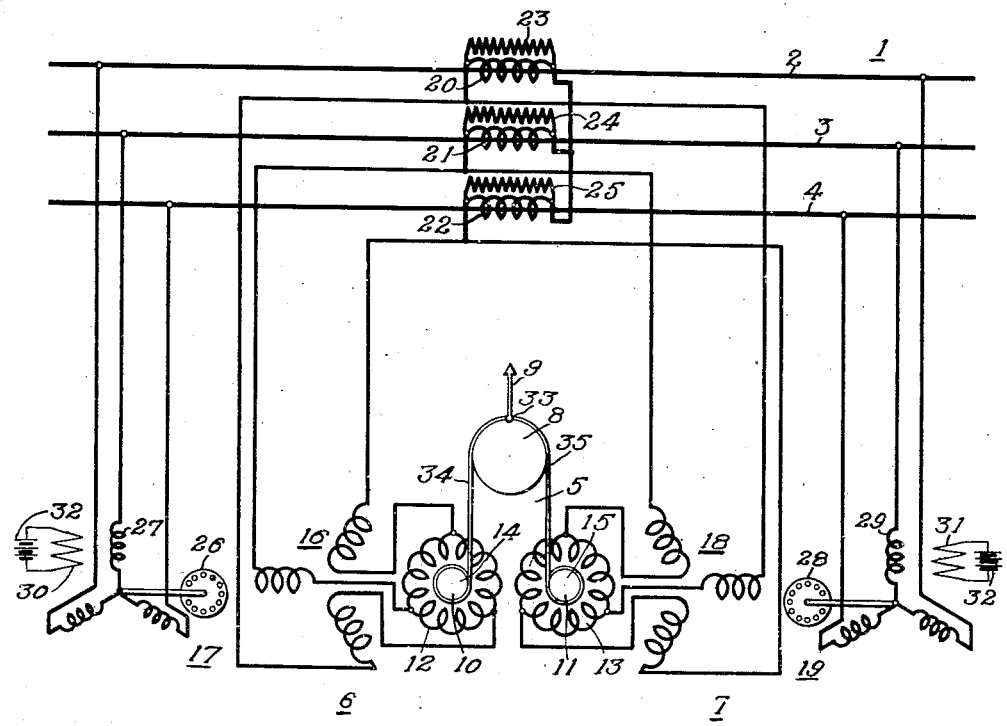
WITNESSES:
J. A. Helsel
J. M. Procter
INVENTOR
Charles Le G. Fortescue
BY
Wesley G. Carr
ATTORNEY Patented Apr. 28, 1925.

1,535,594

UNITED STATES PATENT OFFICE.

CHARLES LE G. FORTESCUE, OF PITTSBURGH, PENNSYLVANIA, ASSIGNOR TO WESTINGHOUSE ELECTRIC & MANUFACTURING COMPANY, A CORPORATION OF PENNSYLVANIA.

ELECTRICAL MEASURING INSTRUMENT.

Application filed August 9, 1920, Serial No. 402,294. Renewed September 23, 1924.

*To all whom it may concern:*

Be it known that I, CHARLES LE G. FORTESCUE, a subject of the King of Great Britain, and a resident of Pittsburgh, in the county of Allegheny and State of Pennsylvania, have invented a new and useful Improvement in Electrical Measuring Instruments, of which the following is a specification.

My invention relates to measuring instruments and particularly to instruments for measuring symmetrical components of unbalanced quantities.

One object of my invention is to provide a measuring instrument that shall indicate directly the unbalance factor of an electrical circuit.

Another object of my invention is to provide a measuring instrument, of the above indicated character, that shall be simple and inexpensive to construct and effective in its operation.

Copending application, Serial No. 358,373, filed Feb. 13, 1920, by C. Le G. Fortescue, L. W. Chubb and J. Slepian and assigned to the Westinghouse Electric & Manufacturing Company, discloses a phase-sequence component meter or measuring system whereby an unbalanced electrical quantity may be resolved into equal symmetrical quantities.

In my present invention, I employ two phase-sequence component meters, substantially as set forth in the above mentioned application, and an eccentrically pivoted cam member. The cam member is provided with a pointer which is actuated in accordance with the resultant of the movement of the two meters and, consequently, the movement of the pointer is an indication of the ratio of the negative and the positive phase-sequence components of the unbalance factor of the system or in other words is an indication of the unbalance factor of the circuit.

The single figure of the accompanying drawing is a diagrammatic view of an electric circuit embodying my invention.

An electric circuit 1 comprises conductors 2, 3 and 4 across which an unbalanced voltage is impressed or which is so unequally loaded as to cause the voltage thereacross to be unbalanced. It is desired to determine the unbalance factor of the circuit 1 or the ratio of the negative to positive phase sequence component of one component of the circuit and, for that purpose, I provide a measuring instrument 5 which comprises, in general, two phase-sequence component meters 6 and 7, a cam member 8 and a pointer 9.

The meters 6 and 7 comprise motor meters 10 and 11 having stator windings 12 and 13 and rotors 14 and 15, respectively. The stator windings 16 of a motor 17 are connected in circuit with the stator winding 12 of the motor meter 10 and, similarly, the stator windings 18 of a motor 19 are connected to the stator windings 13 of the motor meter 11. The windings 16 and 18 are so connected to series transformers 20, 21 and 22, which are associated with the conductors 2, 3 and 4, that voltages are impressed across the windings 16 and 18 proportional to the currents traversing the conductors 2, 3 and 4 and in phase with those currents. For that purpose, resistors 23, 24 and 25 are connected in shunt relation to the windings 20, 21 and 22.

The rotor 26 of the motor 17 is driven synchronously by a synchronous motor 27, and the rotor 28 of the motor 19 is driven synchronously by a synchronous motor 29. The stator windings of the motors 27 and 29 are connected to the circuit 1 and the field windings 30 and 31 thereof are supplied with direct current from batteries 32.

The cam member 8 is eccentrically pivoted at a point 33, and flexible cords 34 and 35 are attached thereto and to the rotors 14 and 15. The cam 8 is eccentrically pivoted at the point 33 in order that a balance may be obtained between the motor meters 10 and 11 without causing rotation of the pointer 9. In other words, the length of the lever arms through which the pointer 9 is actuated so changes that a balance is obtained which indicates the ratio of the torques of the two motor meters 10 and 11. The rotors 26 and 28 are actuated at synchronous speed with respect to the current traversing the circuit 1 and, since the windings 16 and 18 are connected to the circuit 1, the rotors 14 and 15 of the motor meters 10 and 11 will be actuated in accordance with the positive and negative phase-sequence components, respectively, of the current traversing the circuit 1. It has been determined that if a rotor such as the rotor 26 is driven synchronously in one direction in a field, the windings 16 of which are supplied with voltages proportional to the currents traversing a polyphase circuit, a voltage will be developed in the windings proportional to one phase sequence component of the unbalanced current traversing the circuit. If the rotor 26 is driven in the other direction a voltage will be developed in the windings 16 in proportion to the other phase sequence component of the unbalanced current traversing the circuit. Correspondingly, if the rotor 26 is driven in one direction and the rotor 28 in the other direction, the windings 16 and 18, and consequently the windings 12 and 13, will be traversed by currents proportional to the positive and negative phase sequence components, respectively, of the unbalanced currents traversing the circuit 1. The pointer 9 will be turned about the point 33 a distance proportional to the ratio of the indication of one meter to the other and, consequently, if one meter indicates the negative and the other the positive phase-sequence component, the pointer 9 will indicate the ratio which is the unbalance factor or a measure of the unbalance of current traversing the circuit 1.

My invention is not limited to the specific structures illustrated as it may be variously modified without departing from the spirit and scope of the invention, as set forth in the appended claims.

I do not claim broadly a device responsive to a symmetrical component of an unbalanced electrical quantity of a polyphase system, the broad claims to such a device being in the copending application referred to above.

I claim as my invention:

1. A measuring instrument for an electric circuit comprising two motor meters, a movable member operatively connected to both motor meters, and means for supplying one motor meter with current in accordance with one phase-sequence component and the other in accordance with another phase-sequence component of an electrical quantity of the circuit.

2. An unbalance factor meter for a polyphase electric circuit comprising an eccentrically pivoted member having a pointer thereon, two oppositely acting operating members for the pivoted member and means for actuating one in accordance with one phase-sequence component and the other in accordance with another phase-sequence component of the current traversing the circuit.

3. An unbalance factor meter for a polyphase electric circuit comprising an eccentrically pivoted member having a pointer thereon, two oppositely acting operating members for the pivoted member and means for actuating the members in accordance with the positive and negative phase-sequence components, respectively, of the current traversing the circuit.

4. An unbalance factor meter for a polyphase electric circuit comprising an eccentrically pivoted member having a pointer thereon, two oppositely acting operating members for the pivoted member and means for actuating the members in accordance with the positive and negative phase-sequence components, respectively, of an electrical quantity of the circuit.

5. An unbalance factor meter for a polyphase electric circuit comprising an eccentrically pivoted cam member, two motor meters, means for connecting the meters to the cam member and means for so energizing the motor meters that the pivoted member is turned an amount proportional to the unbalance factor of the circuit.

6. An unbalance factor meter for a polyphase electric circuit comprising an eccentrically pivoted cam member, two motor meters, flexible means for connecting the meters to the cam member and means for so energizing the motor meters that the pivoted member is turned an amount proportional to the ratio of the positive to the negative phase-sequence components of the current traversing the circuit.

7. An unbalance factor meter for a polyphase electric circuit comprising a cam member having a pointer thereon, means for eccentrically pivoting the cam member, two motor meters, flexible means for connecting the meters to opposite sides of the cam member, and means connected between the circuit and the motor meters for causing the same to be actuated in accordance with two symmetrical components of the unbalance current traversing the circuit.

8. An unbalance factor meter for a polyphase electric circuit comprising a movable member, two actuating members for the movable member actuated in accordance with the positive and negative phase-sequence components, respectively, of an electrical quantity on the circuit, and means for so balancing one actuating member against the other that the movable member is actuated to indicate the unbalance factor of the circuit.

9. An unbalance factor device for a polyphase electric circuit comprising a movable member, differential actuating means for said member energized in accordance with the positive and negative phase-sequence components of current traversing the circuit respectively and connections between said means and said member to actuate said member in accordance with the unbalance factor of the circuit.

10. The combination of a polyphase circuit, a movable member, and means for actuating said member in accordance with the relative values of the positive and the negative phase-sequence components of current flowing in said circuit.

In testimony whereof, I have hereunto subscribed my name this 28th day of July 1920.

CHARLES LE G. FORTESCUE.